April 26, 1949.　　A. E. W. JOHNSON　　2,468,632
CENTRIFUGAL SEPARATOR BOWL VALVE
Filed June 24, 1946
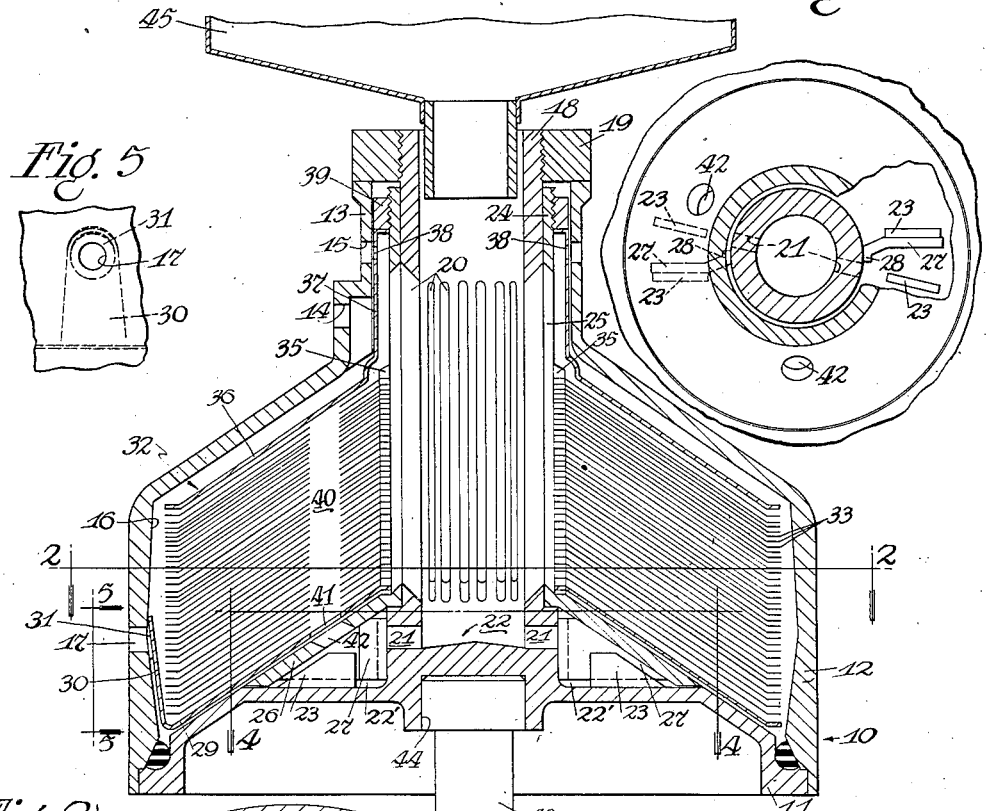
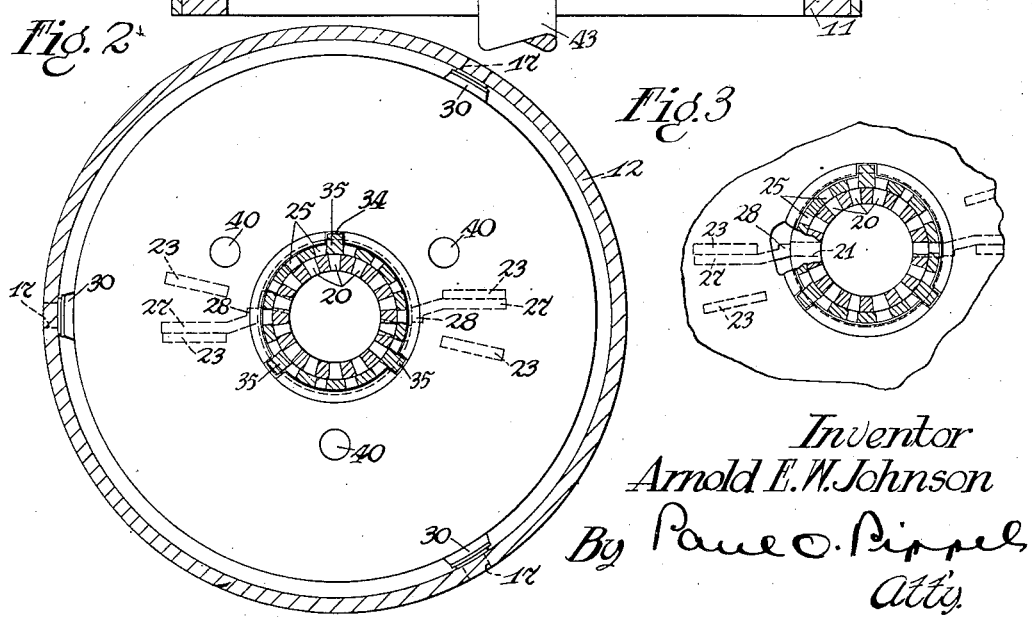
Inventor
Arnold E. W. Johnson
By Paul O. Pippel
Atty.

Patented Apr. 26, 1949

2,468,632

UNITED STATES PATENT OFFICE 2,468,632

CENTRIFUGAL SEPARATOR BOWL VALVE

Arnold E. W. Johnson, Oak Park, Ill., assignor to International Harvester Company, a corporation of New Jersey Application June 24, 1946, Serial No. 678,925

13 Claims. (Cl. 233—20)

This invention relates to a centrifugal separator, and more particularly to a cream separator of the self-washing type. More specifically, it relates to a cream separator having valve means automatically operable for washing and flushing a cream separator.

In order to overcome the tedious operation of manually and individually washing a cream separator bowl, disks, and other associated parts, a self-washing cream separator has been provided. This type of separator permits the complete washing and flushing of the interior of the separator bowl without disassembling any parts. Such a self-washing cream separator bowl generally has a plurality of flushing openings at its periphery. These flushing openings are provided with valve means generally automatically operable, upon the lowering of the speed of rotation of said bowl, to be regulated and thereby permit the washing liquid to escape radially and flush the bowl. It is applicant's prime object to provide an improved self-flushing cream separator bowl having improved automatic operable means for closing and opening the flushing valves of the bowl.

It is another object to provide an improved distributing member for a self-washing cream separator, said distributing member having automatic controllable distributing means.

It is another object to provide an improved valve construction for a self-washing cream separator wherein the valve is circumferentially shiftable to open and close the discharge openings of the separating bowl.

It is still another object to provide an overrunning valve structure shiftable by inertia to control the washing action of a self-washing cream separator.

It is still another object to provide an improved supporting means for carrying the disk pack of a self-washing cream separator.

These and other objects of the invention will become more apparent from the following description when read in conjunction with the accompanying drawing, in which:

Figure 1 is a vertical cross-sectional view through a centrifugal cream separator bowl showing its driving means and a material supply means for said bowl;

Figure 2 is a sectional view taken along the line 2—2 of Figure 1;

Figure 3 is a fragmentary view similar to Figure 2 disclosing a particular operating position of the parts of the separating bowl;

Figure 4 is a sectional view taken along the line 4—4 of Figure 1; and

Figure 5 is a detail view taken along the line 5—5 of Figure 1 showing a flushing opening for a cream separator bowl and the valve means therefor.

A revoluble cream separating bowl is generally designated by the reference character 10 and includes an annular base member 11, and an upper shell portion 12 connected together in sealing engagement. The upper shell portion 12 is provided with a vertical neck portion 13 having skim milk outlets 14 and cream outlets 15. The revoluble bowl 10 is provided with an inner sloping peripheral surface 16 converging to a maximum internal periphery at which point the upper shell portion 12 is formed with a plurality of washing or flushing ports 17, as best shown in Figures 1 and 2. The number of these ports 17 may vary according to the flushing action necessary, but it has been generally found that three are satisfactory.

Projecting axially upwardly and integrally formed within the base member 11 is a distributor tube 18. This distributor tube 18 is provided at its uppermost end with a threaded collar 19 rigidly and securely tightened to hold the upper shell portion 12 and the base member 11 in secure sealing engagement. The distributor tube 18 is formed with a plurality of axially extending discharge openings or slots 20 circumferentially spaced around said tube. A plurality of milk distributing openings 21 are formed in the distributor 18, and each opening 21 is in communication with a primary distributing chamber 22, formed in the lower end of the distributor tube 18, and a secondary distributing chamber 22', formed in the base member 11. The base member 11 is further provided with a plurality of upwardly projecting driving lugs 23, said lugs being best shown in Figures 2 and 4.

An overrunning valve member in the form of a tubular element 24 encircles the distributor tube 18 and is journaled thereon for angular movement with respect thereto. The valve member 24 is also provided with a plurality of axially extending and circumferentially spaced slots 25 which are arranged to aline themselves in registry with the slots 20 upon one position of the distributor 18 and the valve member 24, this position being best shown in Figure 3. The valve member 24 is provided at its lower end with a conical portion 26, said portion providing a cover for the secondary distributing chamber 22'. A pair of depending projections 27, circumferentially spaced at approximately 180° as best shown in Figures 2 and 4, are formed in the conical portion 26 and are adapted to engage the driving lugs 23 in a manner which will presently become more apparent. The depending projections 27 have turned end portions 28 which serve to partially close the openings 21 as best indicated in Figure 3.

A conical valve disk 29 is positioned immediately above the conical portion 26 and is rigidly connected to the overrunning valve member 24 and axially movable with said member. The valve disk 29 is provided at its outer periphery with a plurality of vertically extending spring or port valves 30 made of any suitable resilient spring-like material. Each spring valve 30 is provided with a sealing element 31 adapted to engage the ports 17 for properly sealing the same. Only one of the spring or port valves 30 is shown, since it is to be understood that like valves are used for any number of ports that may be desired.

A disk pack generally indicated at 32 is positioned within the bowl 10. This disk pack 32 includes a plurality of frustro-conical disks 33, the inner peripheries of which are provided with a plurality of apertures 34 as best shown in Figure 2. The apertures 34 are adapted to engage projections, or vanes 35, integrally formed with the overrunning valve member 24. The apertures 34 also serve to provide a vertical channel for the separated cream, said cream moving upwardly and out through the cream opening 15. The disk pack 32 is provided at its top with a closure disk 36 having a vertically extending collar portion 37 formed with openings 38 in communication with the cream outlets 15. This closure disk is of the conventional type and serves to provide a separating wall between the separated cream and the skimmed milk. A threaded member 39 is screwed to the uppermost portion of the overrunning valve member 24 and by virtue of its compressive action on the closure disk 36 serves to rigidly secure the disk pack to the overrunning valve member 24.

The frustro-conical disks 33 are provided with eccentric alined openings 40, as best shown in Figures 1 and 2, in communication with the distributing chamber 22 and 22' by means of openings 41 and 42 formed in the conical valve disk 29 and the conical portion 26 respectively.

The separating bowl 10 is driven by means of a shaft 43 keyed within an aperture 44 of the base member 12. The shaft 43 is normally connected to any suitable type of actuating means such as an electric motor or to a manual driving mechanism. A supply can 45 is positioned above the separating bowl 10.

During the operation of the separating bowl, material to be separated is supplied to the distributor 18 by means of the supply can 45. At this point the separating bowl has attained its maximum separating speed which is generally around 10,000 R. P. M. The bowl is driven in a clockwise direction and the driving lugs 23 of the base 12 are in driving engagement with the depending projections 27, this condition being best shown in Figure 2. At this point it will be noted that the openings 25 of the overrunning valve member 24 do not register with the discharge openings 20 of the distributor. The ports 17 are closed by means of the spring valves 30. Milk is now flowing down through the distributor into the distributing chambers 22 and 22' and up into the alined openings 40 into the spaces between the disks, where it will be separated into two components, skim-milk and cream, each one of said components leaving the bowl by their respective outlets. The discharge openings 20 are closed, thereby assuring complete and adequate flow of whole milk to the disk pack by means of the distributing chambers. As shown in Figure 4, the turned ends of the depending projections 27 are not in sealing engagement with the openings 21, thereby permitting a desired free flow of whole milk through said openings.

After the separating operation has been completed, it is desired to immediately flush and dry the separating disks and the associated parts in the bowl. In order to accomplish this, it is necessary to supply sufficient washing liquid in between the spaces formed by the individual disks, and especially so at the inner peripheries of said disks. The slots 20 are opened to permit a radial discharge of the washing liquid in and throughout the peripheral edges of the disk pack and throughout the portions of the bowl, the washing liquid leaving the bowl through the open ports 17.

The opening of the slots 20 and the ports 17 is accomplished in the following manner: During the separating operation, the driving means, which may be in the form of an electric motor, is driving the separating bowl at its maximum speed. The driving means is then stopped or its speed of rotation is sufficiently curtailed so that the greater rotational speed of the overrunning valve 24 causes it to rotate or angularly move to the position indicated in Figure 3. Stated in another manner, the friction of the air upon the rotating bowl 10, combined with the braking action exerted by the slowing down of the driving member, or motor, is sufficient to cause a rapid lowering of the rotational speed of said bowl. This lowering of the speed of the bowl is more rapid than the lowering of the speed of the overrunning valve member 24 and the valve member thus will overrun and quickly assume the overrunning position indicated in Figure 3. In this position, it will be noted that the openings 20 and 25 are in registering alinement and the openings 21 are almost completely closed by means of the turned ends 28. The required, though limited amount of washing liquid is flushed through the chambers 22 and 22'. Since the conical valve disk 29 is circumferentially shiftable with the overrunning valve member 24, the valves 30 have shifted to a position adjacent the ports 17 and the ports 17 are free to permit an unrestricted radial discharge of the washing liquid. Since the openings 21 are now partially closed, washing liquid will build up within the distributor 18 and the primary chamber 22 and will be radially discharged through the slots and throughout all the internal portions of the bowl, and especially so, through the spaces formed by the individual disks. When it is desired to again utilize the bowl for separating, the speed of rotation of the bowl is increased and the overrunning valve will again assume the position shown in Figure 2 wherein the openings 20 and the ports 17 are closed.

The operation above described may be of a preferred mode. However, it is to be understood that the same result can be accomplished by utilizing a driving force which is reversible by using a reversible motor or a reversible hand operating means. The overrunning of the valve 24 can be achieved in the same manner as above described, and under some conditions this type of operation may be desirable. Of prime importance and of distinctive achievement is this invention, wherein the washing of a cream separator bowl is controlled by means of an overrunning distributing and discharge valve member which is automatically operable.

It can thus be readily seen that the objects of the invention have been fully achieved and it is to be understood that modifications may be made which do not depart from the spirit of the invention as shown nor the scope thereof as defined in the appended claims.

What is claimed is:

1. In a centrifugal separator having a revoluble separating bowl, means for driving said bowl, the combination therewith of means for supplying fluid material to be separated to said bowl comprising a rotatable tube having a plurality of discharge openings, and an overrunning valve member having a plurality of openings adapted to register with said discharge openings, said valve member being operable by inertia and angularly movable with respect to said tube to close said discharge openings, and thereby control the distribution of material within said bowl.

2. In a centrifugal separator having a revoluble separating bowl, means for driving said bowl, the combination therewith of means for supplying fluid material to be separated to said bowl comprising, a tube axially positioned within said bowl for rotation therewith, said tube having a plurality of circumferentially and axially extending discharge openings, a tubular valve member connected to said tube for relative angular movement, and a plurality of openings formed in said valve member, said discharge openings of said valve member to register with the discharge openings upon changes in the rotation of said bowl, said valve member being operable by inertia to close said discharge openings and thereby control the distribution of material within said bowl.

3. In a centrifugal separator having a revoluble bowl, means for driving said bowl, the combination therewith of means for supplying material to be separated to said bowl comprising a tube axially connected to said bowl for rotation therewith, said tube having a plurality of discharge openings, an overrunning valve member encircling said tube and angularly movable with respect thereto, and means on said valve member operable to open or close said discharge openings upon changes in the rotation of said bowl, thereby controlling the distribution of material within said bowl.

4. In a centrifugal separator having a revoluble separating bowl, means for driving said bowl, the combination therewith of means for supplying material to be separated to said bowl comprising a rotatable distributor axially positioned within said bowl, said distributor having a plurality of discharge openings formed therein, an overrunning valve member connected to said distributor and angularly reversible with respect thereto, means on said valve member operable to limit and seal the discharge openings in said distributor, and means between said bowl and said valve member operable to limit the angular movement of said valve member with respect to said distributor.

5. In a centrifugal separator having a revoluble separating bowl, means for driving said bowl, the combination therewith of means for supplying material to be separated to said bowl comprising a rotatable distributor axially positioned within said bowl, said distributor having a plurality of discharge openings formed therein, an overrunning valve member connected to said distributor and angularly reversible with respect thereto, means on said valve member operable to seal the openings in said distributor, and stop means on said distributor operable to engage said valve member for limiting the angular movement thereof with respect to said distributor.

6. In a centrifugal device including a revoluble separating bowl having a plurality of washing ports, and driving means for said bowl, the combination therewith of means for supplying material to be separated to said bowl comprising a tube axially positioned within said bowl for rotation therewith, said tube having a plurality of circumferentially spaced discharge openings, an overrunning valve member journaled on said tube for relative angular movement, means on said valve member operable to open and close said discharge openings upon the movement of said valve member, and resilient valves connected to said overrunning valve member operable to open or close said washing ports upon angular movement of said valve member.

7. In a centrifugal device including a revoluble separating bowl having a plurality of washing ports, and driving means for said bowl, the combination therewith of means for supplying material to be separated to said bowl comprising a tube axially positioned within said bowl for rotation therewith, said tube having a plurality of circumferentially spaced discharge openings, an overrunning valve member journaled on said tube for relative angular movement, means on said valve member operable to open and close said discharge openings upon the movement of said valve member, port valves connected to said overrunning valve member and operable to open or close said washing ports upon angular movement of said valve member, and stop means on said valve member for limiting its relative axial movement.

8. A centrifugal separator comprising in combination with a revoluble bowl, means for driving said bowl, a pack of frustro-conical disks disposed within said bowl, the inner edges of said disks defining a cylindrical space extending axially of said bowl, a distributor tube projecting within said cylindrical space, said tube having a plurality of circumferentially spaced openings arranged to supply washing liquid throughout the inner portion of said bowl, means for supplying liquid to said tube, and overrunning valve means operable by inertia to close the openings of said tube during a change in the driving force and the rotation of said bowl.

9. A centrifugal separator comprising in combination with a revoluble bowl, means for driving said bowl, a pack of frustro-conical disks disposed within said bowl, the inner edges of said disks defining a cylindrical space extending axially of said bowl, a distributor tube projecting within said cylindrical space, said tube having a plurality of circumferentially spaced openings arranged to supply washing liquid throughout the inner portion of said bowl, means for supplying liquid to said tube, overrunning valve means operable by inertia to close the openings of said tube during a change in the driving force and the rotation of said bowl, and means on said overrunning valve engageable with said disks for carrying the same for rotation with said bowl.

10. A centrifugal separator comprising in combination with a revoluble bowl having a plurality of washing ports at its internal periphery, of means for driving said bowl, a disk pack within said bowl, said disk pack being provided with an axially extending cylindrical space, a tube projecting into said space, said tube having a plurality of discharge openings arranged to supply liquid to said disk pack, an overrunning valve member journaled for angular movement on said tube, said valve member having a plurality of openings adapted to register with said discharge openings, means on said valve member operable to bring said openings in registering alinement upon the overrunning action of said valve member, and port valves connected to said overrunning valve member for sealing said washing ports, said port valves being angularly movable to open said washing ports during the overrunning of said valve member.

11. A centrifugal separator comprising in combination with a revoluble bowl having a plurality of washing ports at its internal periphery, of means for driving said bowl, a tube connected for rotation to said bowl, said tube having a plurality of discharge openings arranged to supply liquid to said disk pack, an overrunning valve member journaled for angular movement on said tube, said valve member having a plurality of openings adapted to register with said discharge opening, means on said valve member operable to bring said openings in registering alinement upon the overrunning action of said valve member, and port valves connected to said overrunning valve member for sealing said washing ports, said port valves being angularly movable to open said ports during the overrunning of said valve member.

12. In a centrifugal separator having a revoluble bowl, said bowl being provided with a plurality of washing ports at its maximum internal periphery, means for driving said bowl, the combination therewith of material supply means projecting into said bowl for supplying material to be separated thereto, an overrunning member positioned within said bowl and angularly movable with respect thereto upon a change in the rotation of said bowl, and valve means on said overrunning member angularly movable to cooperate with said washing ports for regulating the discharge through the same during said change.

13. In combination, a centrifugal separator having a revoluble bowl, washing ports formed in the periphery of said bowl, means for driving said bowl, a distributor axially positioned for rotation with said bowl, said distributor being formed with a plurality of discharge outlets, an overrunning valve member journaled on said distributor and angularly movable with respect thereto for opening and closing said discharge outlets, circumferentially shiftable valves connected to said overrunning valve member for opening and closing said washing ports, and means for supplying washing liquid to said distributor, said discharge openings and said washing ports being simultaneously open upon the overrunning action of said valve member to permit a radial distribution and discharge of washing liquid to and from said bowl.

ARNOLD E. W. JOHNSON.

REFERENCES CITED

The following references are of record in the file of this patent:

UNITED STATES PATENTS

| Number | Name | Date |
|---|---|---|
| 528,690 | Ponten et al. | Nov. 6, 1894 |
| 802,724 | Adams | Oct. 24, 1905 |
| 1,751,982 | Dunham | Mar. 25, 1930 |
| 2,173,579 | Fawcett | Sept. 19, 1939 |
| 2,173,580 | Fawcett | Sept. 19, 1939 |
| 2,256,316 | Eddy | Sept. 16, 1941 |

FOREIGN PATENTS

| Number | Country | Date |
|---|---|---|
| 23,115 | Great Britain | Nov. 11, 1912 |

Certificate of Correction

April 26, 1949.

Patent No. 2,468,632.

ARNOLD E. W. JOHNSON

It is hereby certified that error appears in the printed specification of the above numbered patent requiring correction as follows:

Column 5, line 34, claim 2, after the word "member" insert the words *being adapted*; and that the said Letters Patent should be read with this correction therein that the same may conform to the record of the case in the Patent Office.

Signed and sealed this 18th day of October, A. D. 1949.

[SEAL]

THOMAS F. MURPHY,
*Assistant Commissioner of Patents.*